(12) United States Patent
Smith et al.

(10) Patent No.: US 8,122,622 B2
(45) Date of Patent: *Feb. 28, 2012

(54) GROUND ENGAGING TOOL SYSTEM

(75) Inventors: Murray A Smith, Toronto (CA); Craig E. Harder, Edmonton (CA)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/818,345

(22) Filed: Jun. 18, 2010

(65) Prior Publication Data

US 2011/0035971 A1  Feb. 17, 2011

Related U.S. Application Data

(63) Continuation of application No. 11/840,144, filed on Aug. 16, 2007, now Pat. No. 7,762,015.

(60) Provisional application No. 60/822,634, filed on Aug. 16, 2006.

(51) Int. Cl.
   *E02F 9/28* (2006.01)
(52) U.S. Cl. .......................................................... 37/455
(58) Field of Classification Search .................... 37/446, 37/449, 451–460; 172/701.1–701.3; 403/150, 403/153, 297, 355; 299/109, 111, 113
See application file for complete search history.

(56) References Cited

U.S. PATENT DOCUMENTS

| | | | |
|---|---|---|---|
| RE29,900 E * | 2/1979 | Kniff | 299/104 |
| 4,327,947 A * | 5/1982 | Bower, Jr. | 299/107 |
| 5,429,396 A * | 7/1995 | Guest | 285/205 |
| 6,959,506 B2 * | 11/2005 | Adamic et al. | 37/456 |
| 7,178,274 B2 | 2/2007 | Emrich | |
| 7,640,684 B2 | 1/2010 | Adamic et al. | |
| 7,640,685 B2 | 1/2010 | Emrich | |
| 7,762,015 B2 * | 7/2010 | Smith et al. | 37/455 |
| 2011/0107624 A1 | 5/2011 | Carpenter et al. | |

FOREIGN PATENT DOCUMENTS

RU 2067696 C1 10/1996

* cited by examiner

*Primary Examiner* — Robert Pezzuto
(74) *Attorney, Agent, or Firm* — Finnegan, Henderson, Farabow, Garrett & Dunner LLP; Andrew J. Rice

(57) ABSTRACT

A ground engaging tool system comprises a ground engaging tool such as a tip, an adapter mounted to or part of a work tool, and a rotating lock member. The ground engaging tool is attached to the adapter, and a post portion of the adapter slides into a slot provided on the lock. The lock is rotated so that the entrance to the slot is blocked and the post cannot slide out of the slot. The lock in this position is in a locking position, and the retention of the post in the slot of the lock retains the ground engaging tool to the adapter.

27 Claims, 21 Drawing Sheets

Fig_9_

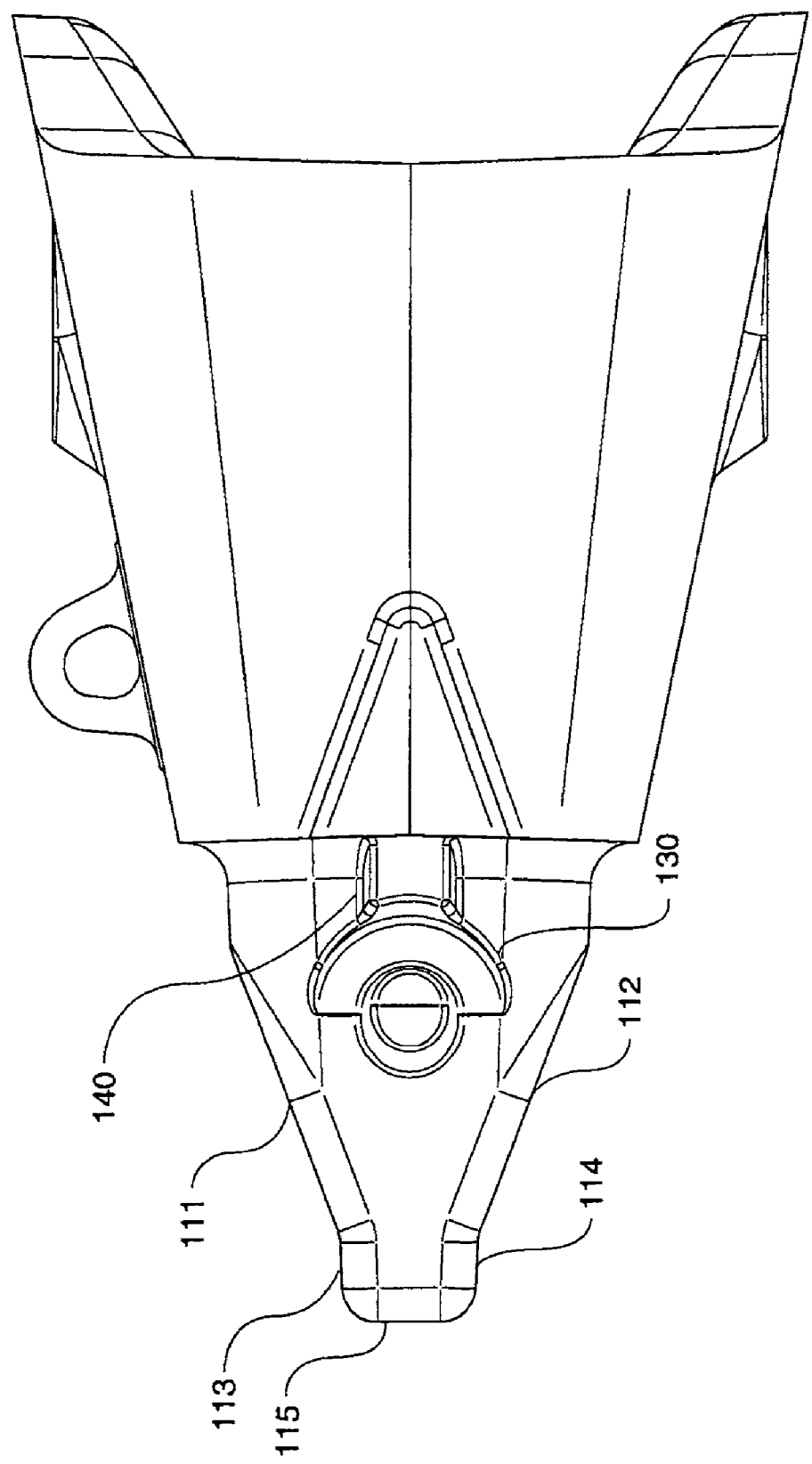

Fig_20.
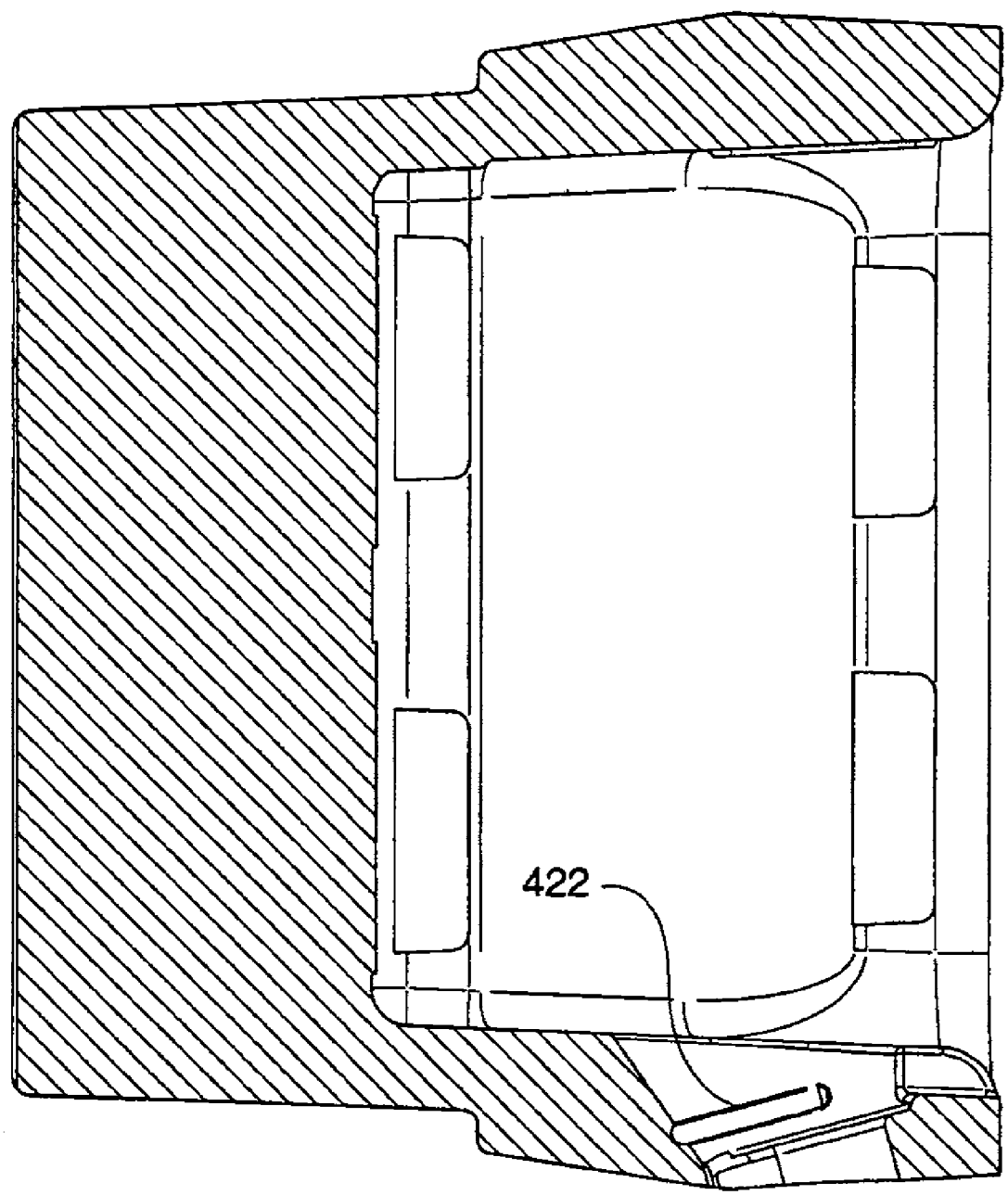

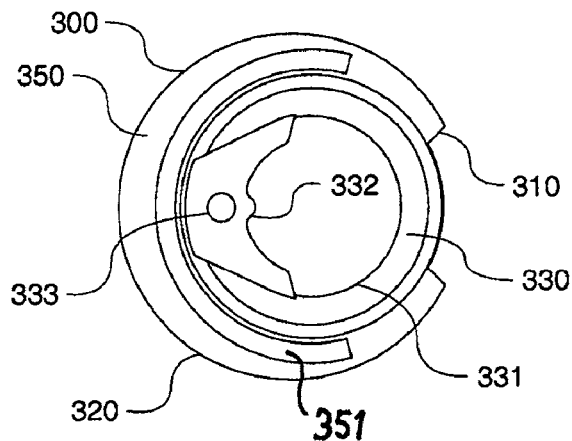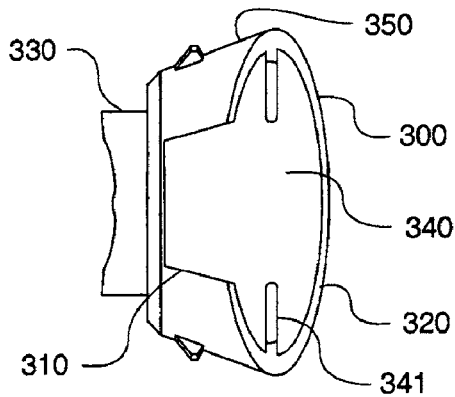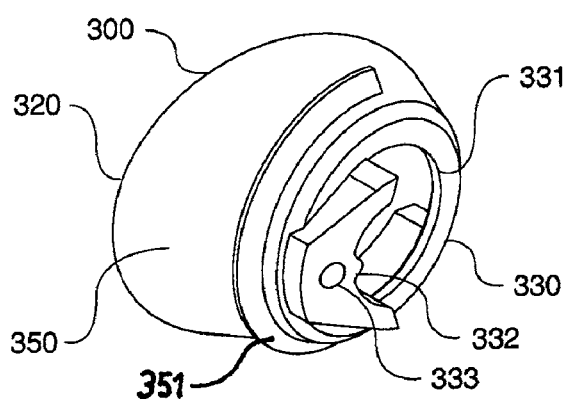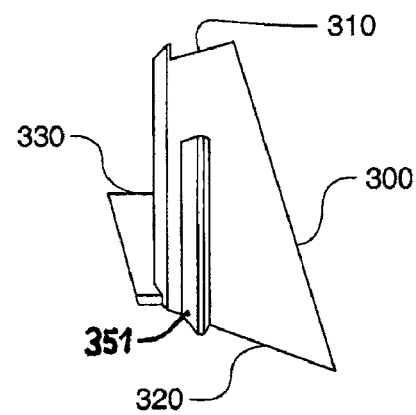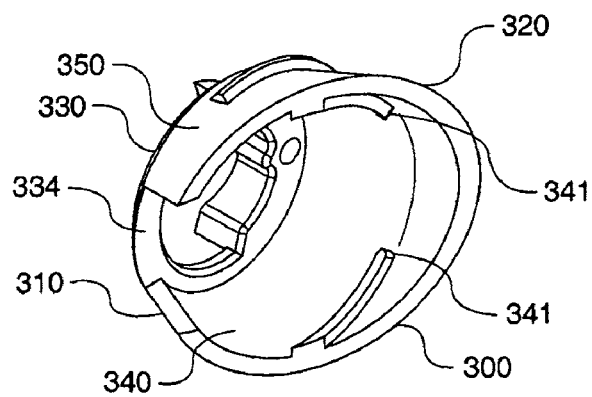

GROUND ENGAGING TOOL SYSTEM

This application is a continuation of U.S. nonprovisional patent application Ser. No. 11/840,144, filed on Aug. 16, 2007, now U.S. Pat. No. 7,762,015, which in turn claims the benefit of U.S. provisional patent application No. 60/822,634 filed Aug. 16, 2006

TECHNICAL FIELD

The field of this invention is ground engaging tools, and more specifically systems for retaining ground engaging tools on buckets, blades, and other work tools.

BACKGROUND

Many construction and mining machines, such as excavators, wheel loaders, hydraulic mining shovels, cable shovels, bucket wheels, and draglines make use of buckets to dig material out of the earth. The buckets can be subjected to extreme wear from the abrasion and impacts experienced during digging. Other construction and mining machines, such as bulldozers, also include blades or other tools that are used to move material such as soil and rock. These blades and other tools can also be subjected to extreme wear through abrasion and other wear mechanisms.

Buckets and blades and other earth-working tools can be protected against wear by including ground engaging tools (GET). GET is typically fashioned as teeth, edge protectors, and other components which are attached to the bucket or blade in the area where the most damaging abrasion and impacts occur. For example, the cutting edge of a bucket can be protected with edge protectors that wrap around and protect the edge.

Thus, one purpose of the GET is to serve as wear material and absorb wear that would otherwise occur on the bucket, blade, or other tool. The GET can be removed when it has been worn and replaced with new GET at a reasonable cost to continue to protect the bucket. Large buckets for draglines and hydraulic shovels can cost a considerable amount, so protecting them against wear and the need for early replacement is important. It is more economical to wear out and replace the GET than to wear out and replace an entire bucket.

In addition to the purpose of protecting against wear, another purpose of the GET may be to provide more effective digging. A tooth mounted on the edge of a bucket, for example, may allow the bucket to penetrate into the soil or rock and dig more effectively with less effort.

Many systems have been proposed and used for removably attaching the GET to buckets and other tools. These systems typically provide a pin or other fastener which holds the GET onto the bucket or other tool. Many problems or disadvantages exist with these known systems. For example, in some conditions the pins can become stuck inside the GET because of rust or because other material gets in the space surrounding the pins and causes binding or adhesion. As another example of a disadvantage of some known attachment systems, some require a hammer to drive in the pin or other fastener. On large GET systems, the hammer required to drive in the pin may likewise be very large, and swinging such a large hammer in difficult field conditions can be objectionable for the technician.

The pin or other fastener must be very secure and reliable and not permit the GET to fall off of the bucket or other work tool, even when the GET is worn extensively. If the GET falls off of the bucket or blade, it could be fed into a crusher or other processing machine and cause damage. Other problems may also occur if the GET inadvertently falls off the bucket, including extensive wear of the exposed area of the bucket left unprotected when the GET fell off which might occur before the problem is detected and repaired. The prior art GET attaching systems have not always held the GET to the bucket or other work tool with adequate reliability.

In general, the prior art GET attaching systems leave room for improvement. This invention provides improvements.

BRIEF DESCRIPTION OF THE DRAWINGS

In FIG. 1, a post (normally attached to the adapter) is sliding into the slot of a lock, the lock being engaged with the tip. In FIG. 2, the post is engaged in the slot, and in FIG. 3, the lock is rotated to the locking position.

FIG. 20 is a sectional view of the tip of FIG. 15 (the adapter, lock, and retainer bushing have been removed in this view).

FIGS. 22A-E are view of the retainer bushing of the first embodiment.

DETAILED DESCRIPTION

FIGS. 1-22 illustrate embodiments and schematic concepts for GET attachment systems according to the invention. The purpose of these figures is only to aid in explaining the principles of the invention. Thus, the figures should not be considered as limiting the scope of the invention to the embodiments and schematic concepts shown therein. Other embodiments of GET attachment systems may be created which follow the principles of the invention as taught herein, and these other embodiments are intended to be included within the scope of patent protection.

Figure 1:
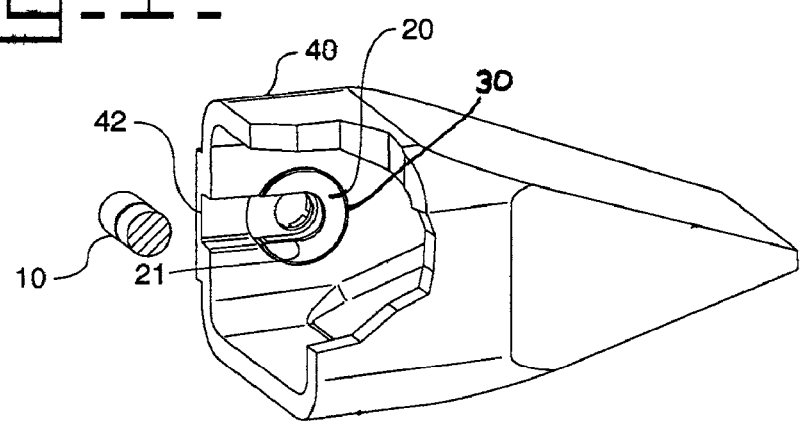
FIGS. 1-3 are schematic assembly views representing a GET attachment system according to the principles of the invention.
Figure 2:
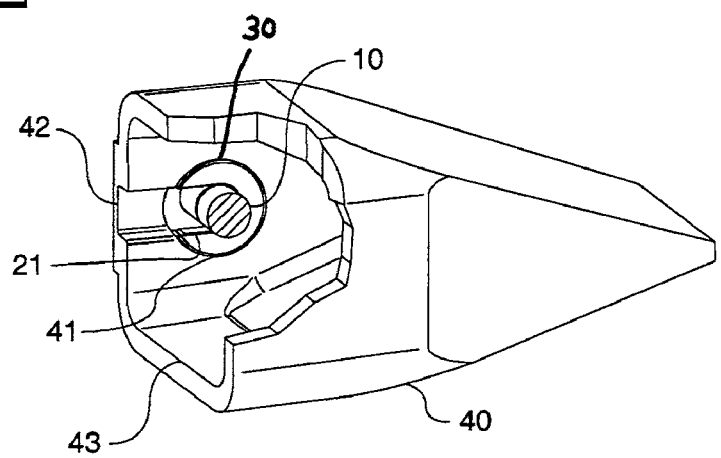
Figure 3:
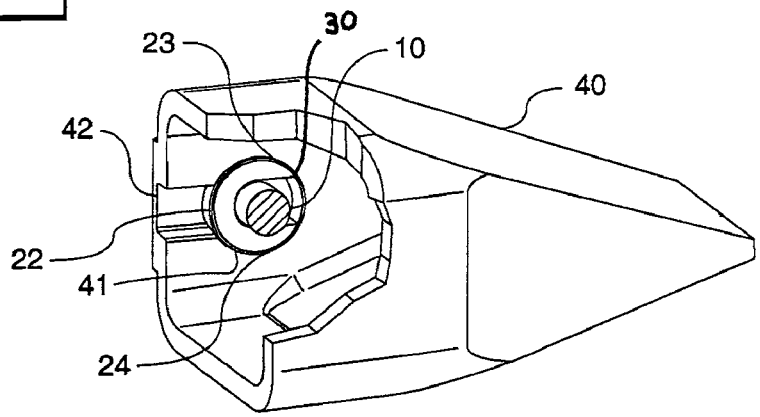

FIGS. 1-3 demonstrate schematically how the GET attachment system holds the GET onto the bucket or blade, and how it locks and unlocks.

With reference first to FIG. 1, a post, or pin, 10 is illustrated. The post 10 may be connected or associated with a bucket, blade, or other work tool. In FIG. 1, only a portion of the post 10 is shown. The portion of post 10 that connects with the bucket, blade, or other work tool has been removed from this view for the purpose of illustrating the manner in which the GET attachment system interacts with the post. A lock 20 is also illustrated. The lock 20 includes a slot 21 formed therein for accepting a portion of post 10. Lock 20 is received in a lock cavity 41 of a tip 40. The lock cavity 41 is shaped to allow the lock 20 to fit therein, and also to allow lock 20 to rotate relative to tip 40. Lock 20 may be placed in lock cavity 41 directly, or a retainer bushing 30 may be disposed around a portion of lock 20, and disposed between the lock 20 and lock cavity 41. The purpose and benefits of the optional retainer bushing 30 will be explained in greater detail hereinafter.

With reference now to FIG. 2, a pictorial view is shown of the post 10 positioned inside of the slot 21 of lock 20. In order for the post 10 to enter slot 21, it may be required to pass through a slot 42 formed in tip 40. This will occur typically by sliding the tip 40 and lock 20 onto a portion of the bucket, blade, or work tool and onto post 10. For example, a bucket may include an adapter with an adapter nose that fits inside of pocket 43 formed in tip 40, in a manner well known in this industry. The post 10 may be connected with the adapter. The post 10 will slide first through slot 42, then into slot 21. Slot 21 need not be a through slot as illustrated, but could also be a blind slot similar to slot 42. With the lock 20 rotated to the orientation relative to the tip 40 that is depicted in FIG. 2, the post 10 can freely slide into and out of the slot 21. This first position of the lock 20 is the unlocking position.

With reference now to FIG. 3, the lock 20 has been rotated, in this case 180 degrees, to a new orientation relative to the tip 40. This second position of the lock 20 is the locking position. In the locking position, the opening of slot 21 is no longer aligned with slot 42. Lock 20 includes a C-shaped portion formed by a rear leg 22 joining together a top leg 23 and an opposite bottom leg 24. Slot 21 is located between the opposing top leg 23 and bottom leg 24. In the locking position of lock 20 shown in FIG. 3, rear leg 22 blocks the post 10 from exiting the slot 21 and sliding out through the slot 42. Thus, with the lock 20 rotated to the locking position, the tip 40 is locked onto the post 10 and the bucket, blade, or work tool to which the post 10 is connected.

FIGS. 1-3 illustrate schematically the basic functioning of the GET attachment system. The system may be adapted to many different applications. For example, the system may be used to attach many different kinds of cutting edges to blades, tips, edge protectors, side cutters and other accessories to buckets, tips to compactor wheels, etc. Many variations of the basic designs shown in FIGS. 1-3 are also possible. Those of ordinary skill in this field will be able to adapt the basic parts to suit a particular need in a given application. For example, the shapes of post 10, lock 20, and slot 21 may vary widely, according to particular needs in a given application. As another example, tip 40 may be more broadly defined as a first element 40 which could take the form of a tip for a bucket or ripper, or could take the form of an edge protector, sidebar protector, or other forms of GET. As another example, the structure that connects to post 10 may be broadly defined as a second element, and may take the form of an adapter permanently or removably attached to a bucket, or may take the form of a bucket sidebar or base edge, or any other portion of a work tool such to which it is desired to attach GET. As another example, the way in which the lock 20 is rotated may vary according to needs of the application. The lock 20 may include a portion that can be rotated by a tool placed through a bore in tip 40. Or, the end of post 10 may be modified so it fits in the slot 21 in a way that the post 10 and lock 20 rotate together. Then a bore in tip 40 may provide access to the end of post 10, and the post 10 could be rotated causing a corresponding rotation of lock 20. Many different designs are possible while still utilizing the basic principles of this attachment system.

FIGS. 4-22 illustrate a first embodiment of a GET attachment system according to these principles. The first embodiment is also exemplary of many additional, optional features which may be incorporated to satisfy particular needs or provide optional benefits.

Figure 4:
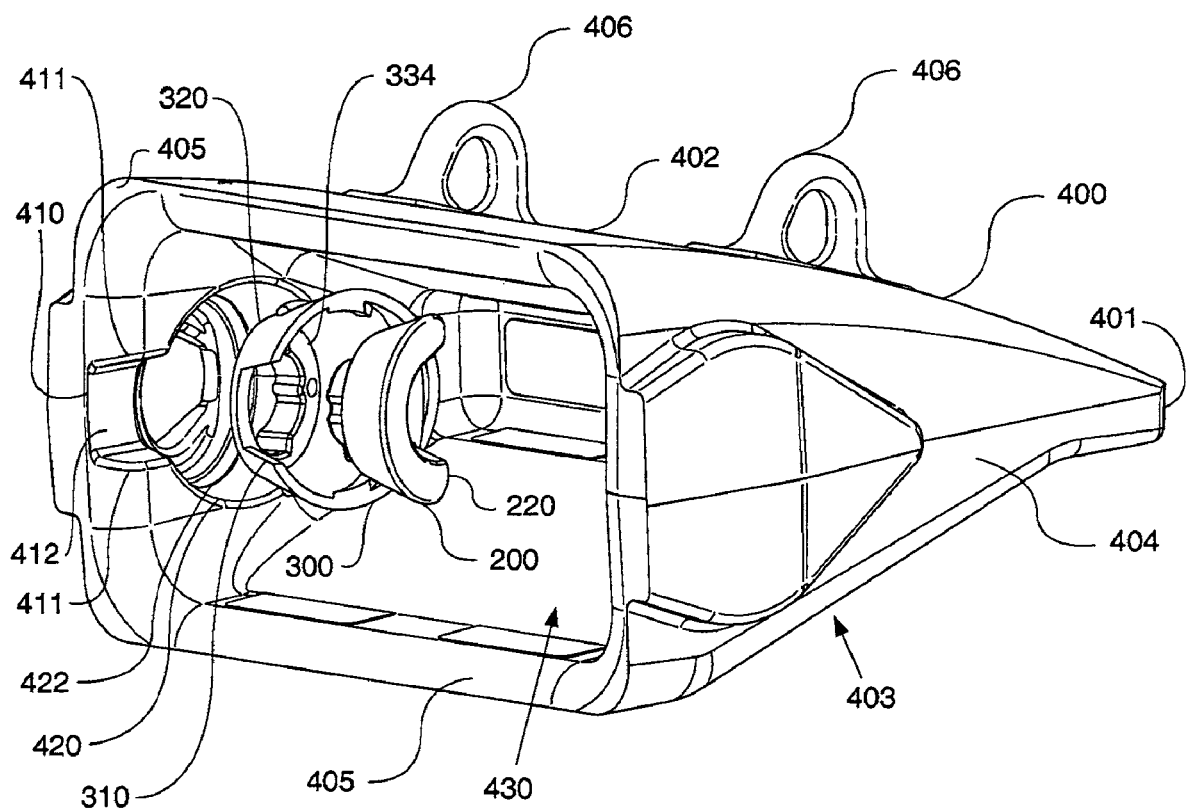
FIG. 4 is a pictorial view of a tip, locking retainer, and lock of a first embodiment, and the manner in which they may be assembled together.
Figure 5:
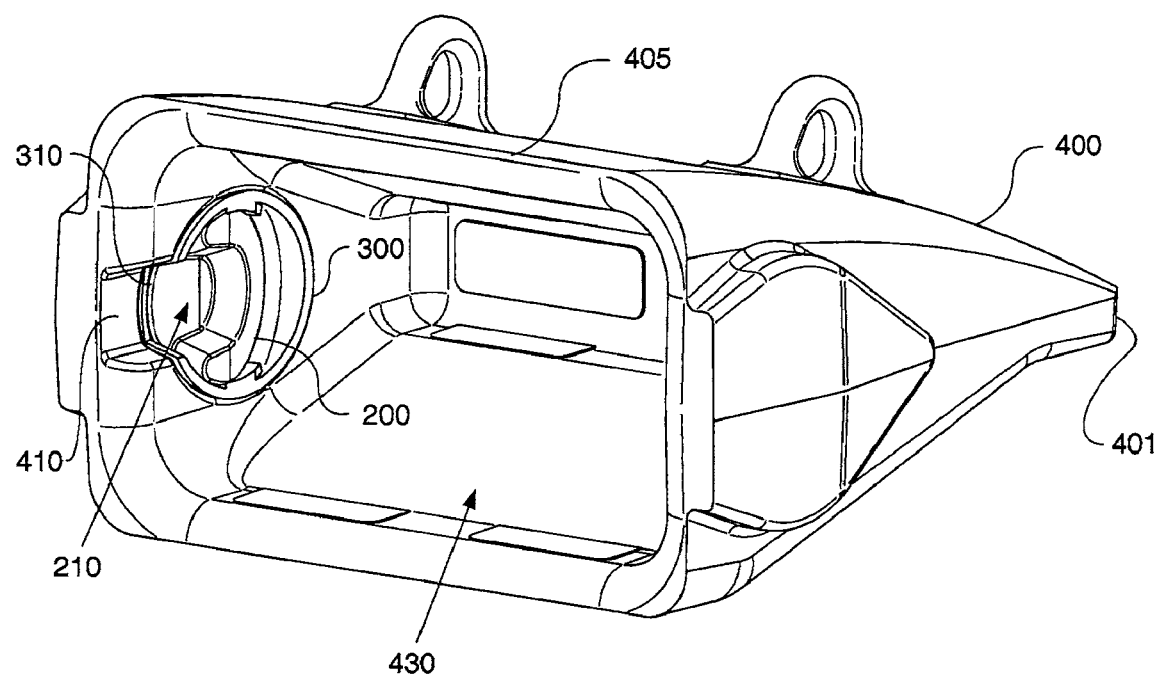
FIG. 5 is a pictorial view of the tip, retainer bushing, and lock assembly according to the first embodiment of FIG. 4, with the lock in an unlocking position.

With reference first to FIG. 4, a lock 200, retainer bushing 300, and tip 400 are illustrated. The tip 400 may be manufactured from steel or any other suitable material. The exterior of the tip 400 features surfaces designed to contact soil and rock, and absorb or resist the abrasive and impact forces. The exterior surfaces can form a relatively sharp front edge 401 in order to permit the tip 400 to penetrate into the soil or rock and facilitate digging. The tip 400 may also include a top portion 402, a bottom portion 403, and side portions 404. In the design shown in FIG. 4, the top portion 402, bottom portion 403, and side portions 404 meet together and form the front edge 401. The top portion 402, bottom portion 403, and side portions 404 also form an interior adapter receiving cavity 430. The adapter receiving cavity 430 is shaped to receive the nose portion of an adapter (see FIG. 13). The adapter receiving cavity 430 opens out of the tip 400 through a rear portion or surface 405. Rear surface is bordered by the top portion 402, bottom portion 403, and side portions 404. Several eyelets 406 may be attached to any of the tip exterior surfaces to facilitate lifting and positioning the tip 400 during installation.

The tip 400 also includes a slot 410 positioned adjacent a lock cavity 420. Lock cavity 420 is sized to receive the lock 200, and optionally the retainer bushing 300 therein. Lock cavity 420 also includes a lock opening 421 (FIG. 6) which leads from the lock cavity 420 to the exterior of the tip 400. Slot 410 includes side walls 411 and a bottom wall 412. Side walls 411 extend away from the adapter receiving cavity 430 towards the bottom wall 412 so that bottom wall 412 is recessed below the surrounding surface of the adapter receiving cavity 430 and slot 410 is generally contained within a side portion 404. Side walls 411 and bottom wall 412 may define a plane of symmetry which extends parallel to the slot's longitudinal axis. The longitudinal axis of slot 410 runs from the rear surface 405 towards the lock cavity 420. The longitudinal axis of slot 410 may also run parallel to the direction of movement of the tip 400 relative to the worktool when the tip is inserted on or removed therefrom (see arrow A, FIG. 16). The slot 410 opens up to the rear surface 405 on one end, and to the lock cavity 420 on the other opposite end.

Retainer bushing 300 can be formed from plastic or any other suitable material. If formed from plastic, it may be desirable to produce it through injection molding. Lock 200 can be formed from steel or any other suitable material. If both tip 400 and lock 200 are formed of steel, then having a plastic retainer bushing 300 creates certain benefits. First, a plastic retainer bushing can prevent metal-to-metal contact, and the wear mechanisms commonly exhibited with such contact. Second, a plastic retainer bushing can help prevent corrosion or other processes between the tip and the lock which, over time, could cause the lock to seize in the tip and make the lock difficult to rotate. If the lock cannot be easily rotated, then the tip removal from the work tool is more difficult. Third, a plastic retainer bushing which can deflect more easily than steel can allow a retaining relationship between the tip and the retainer bushing, and the lock and the retainer bushing, as described more fully below. Thus, the choice of plastic to form the retainer bushing 300 can be particularly advantageous.

With reference to FIG. 4 and FIGS. 22A-E, the retainer bushing 300 includes a slot 310 formed in a substantially circumferential skirt portion 320. The skirt portion 320 may be conically shaped. Attached to the narrower end of the skirt portion 320 is a head portion 330. Head portion 330 includes an opening 331, and a flexible tab 332. Tab 332 flexion is promoted by a relief hole 333 formed in the head portion 330.

With reference to FIG. 4 and FIGS. 21A-E, the lock 200 includes a slot 210. Slot 210 is formed in a C-shaped portion 220 of the lock 200. C-shaped portion 220 includes a rear leg 221, top leg 222, and bottom leg 223. Slot 210 is interposed between top leg 222 and bottom leg 223. On top of C-shaped portion 220 is a head portion 230. Head portion 230 includes two detents 231, 232, formed therein, and an annular surface 233 positioned between the detents 231, 232. A stopping tab 234 is also formed in the head portion 230. Head portion also includes a tool interface 235.

FIGS. 5-8 show views of the lock 200 assembled into the retainer bushing 300, and the retainer bushing 300 assembled into the tip 400. The lock 200 is rotated to its first position, or unlocking position in each of these views. While the lock 200 is in the unlocking position, an adapter or portion of a work tool can be inserted into the adapter receiving cavity 430, and a post or other portion associated with the adapter will simultaneously slide through slot 410, slot 310, and into slot 210.

Figure 6:
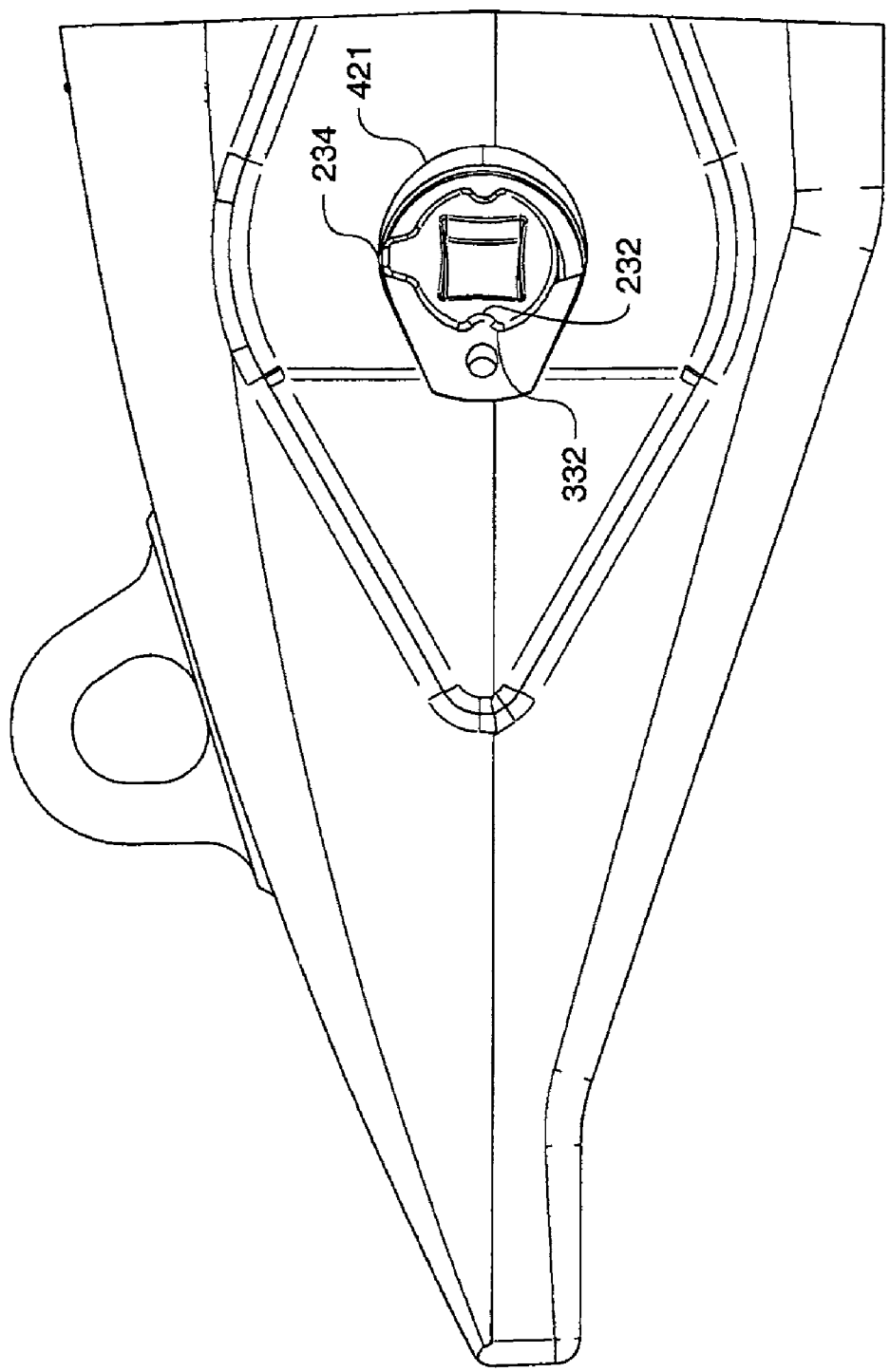
FIG. 6 is a side view of the assembly of FIG. 5.
Figure 7:
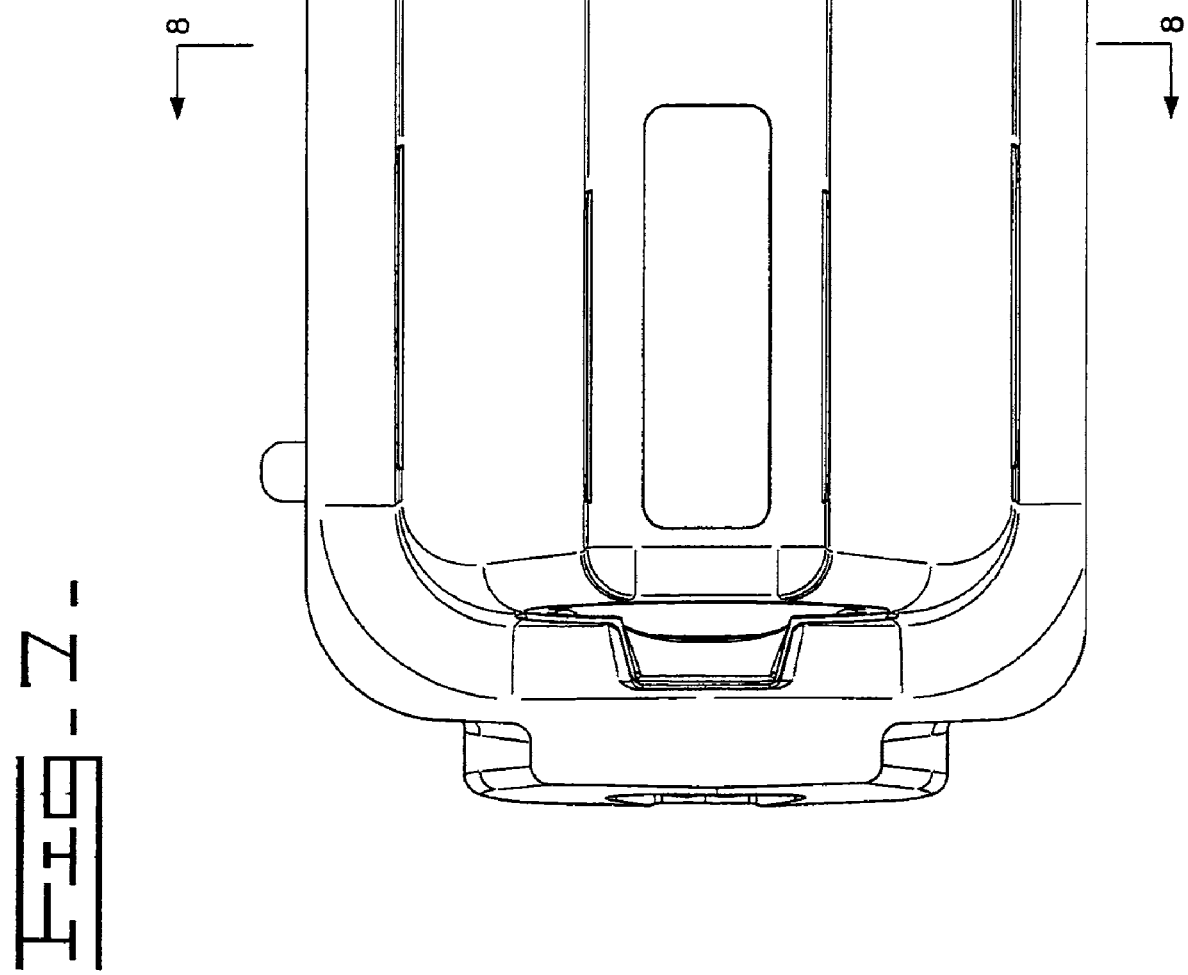
FIG. 7 is a rear view of the assembly of FIG. 5.
Figure 8:
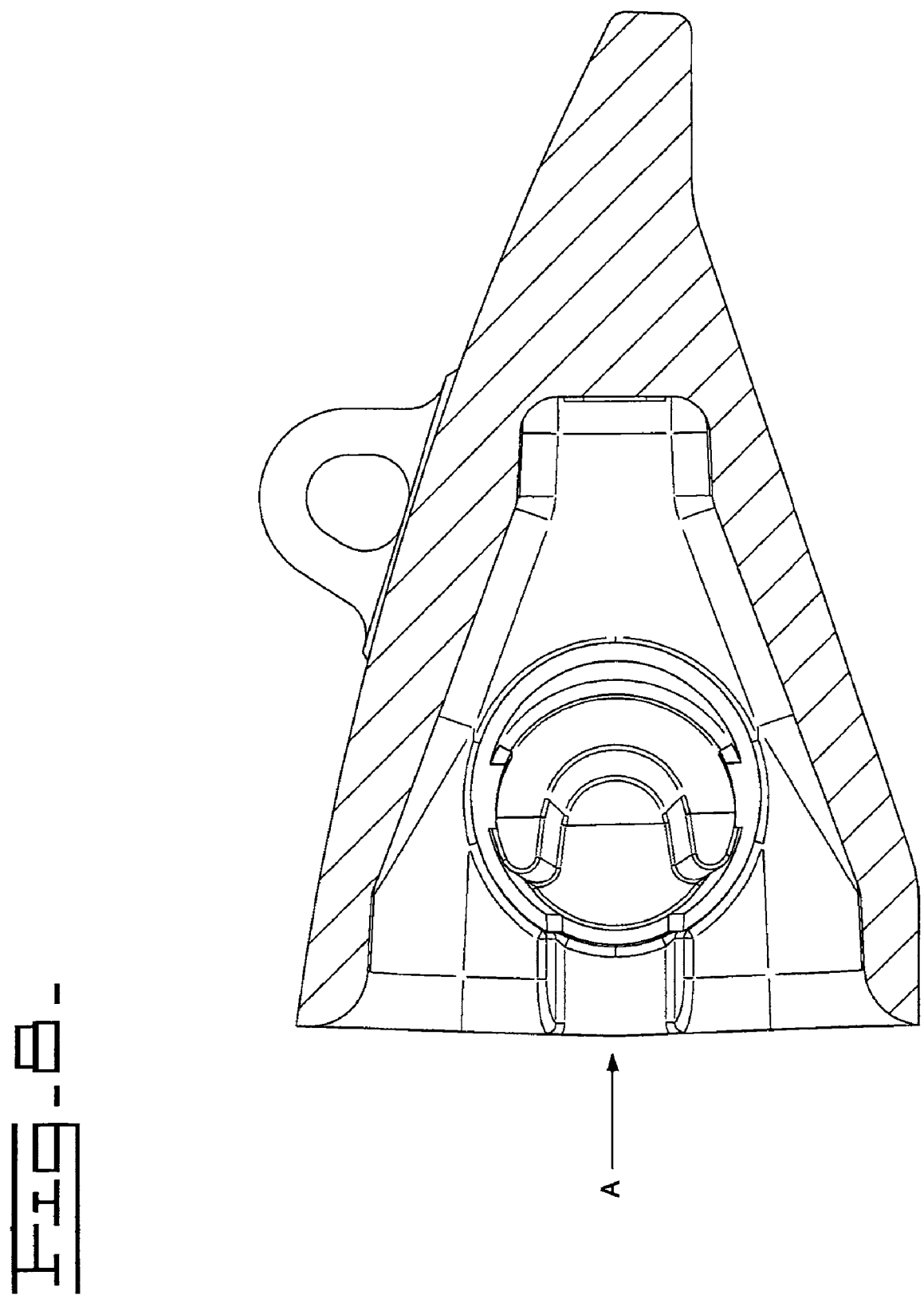
FIG. 8 is sectional view of the assembly of FIG. 5, taken along plane 8-8 indicated in FIG. 7.
Figure 9:
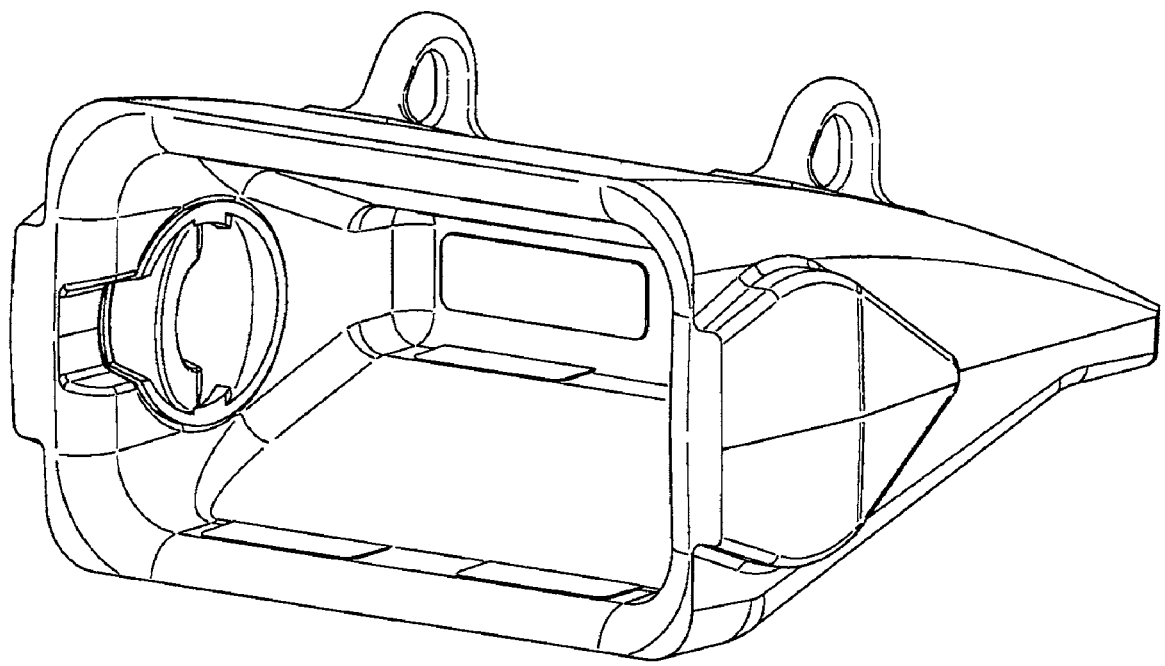
FIG. 9 is a pictorial view of the tip, retainer bushing, and lock assembly according to the first embodiment of FIG. 4, with the lock in a locking position.
Figure 10:
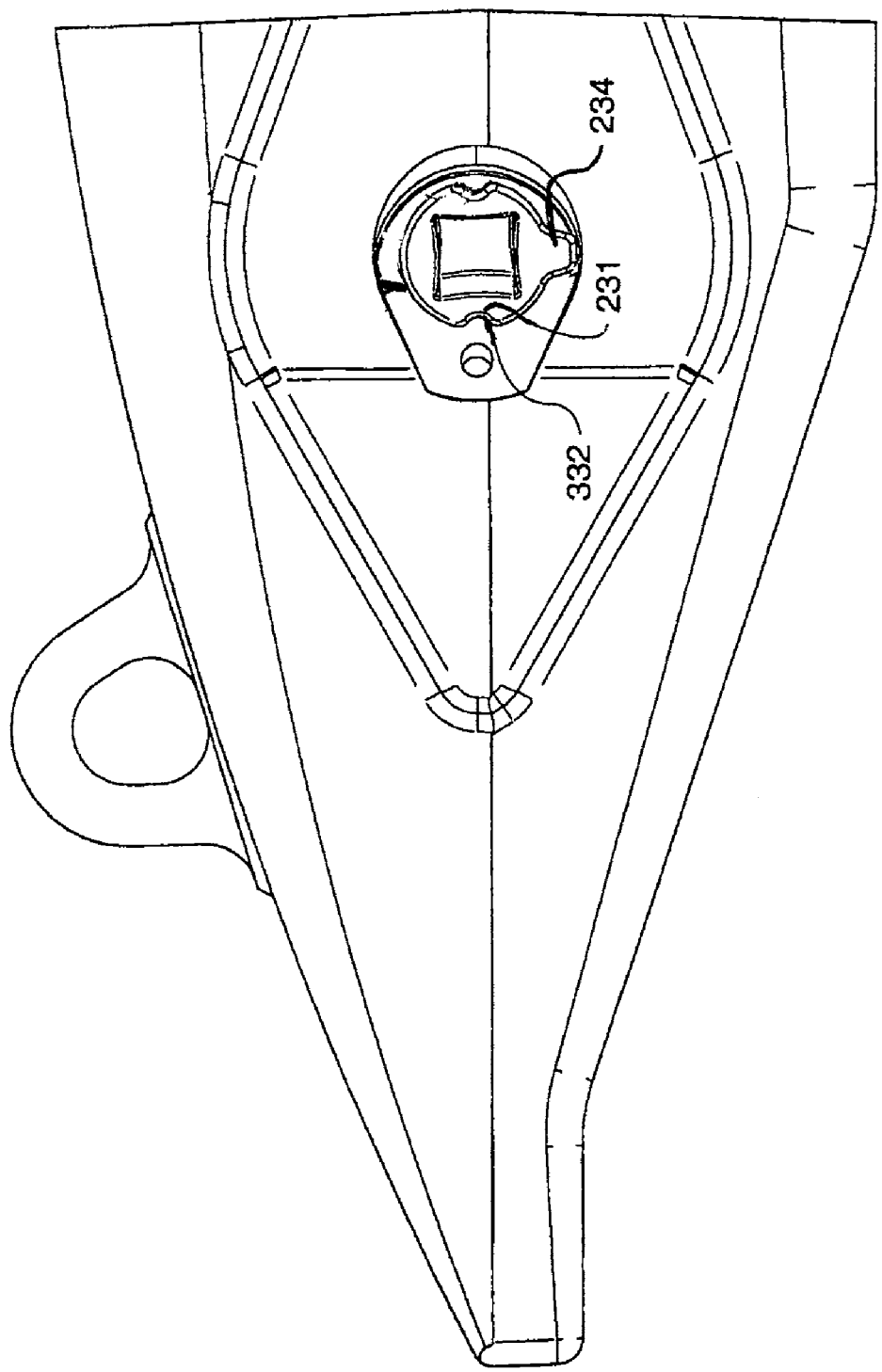
FIG. 10 is a side view of the assembly of FIG. 9.
Figure 11:
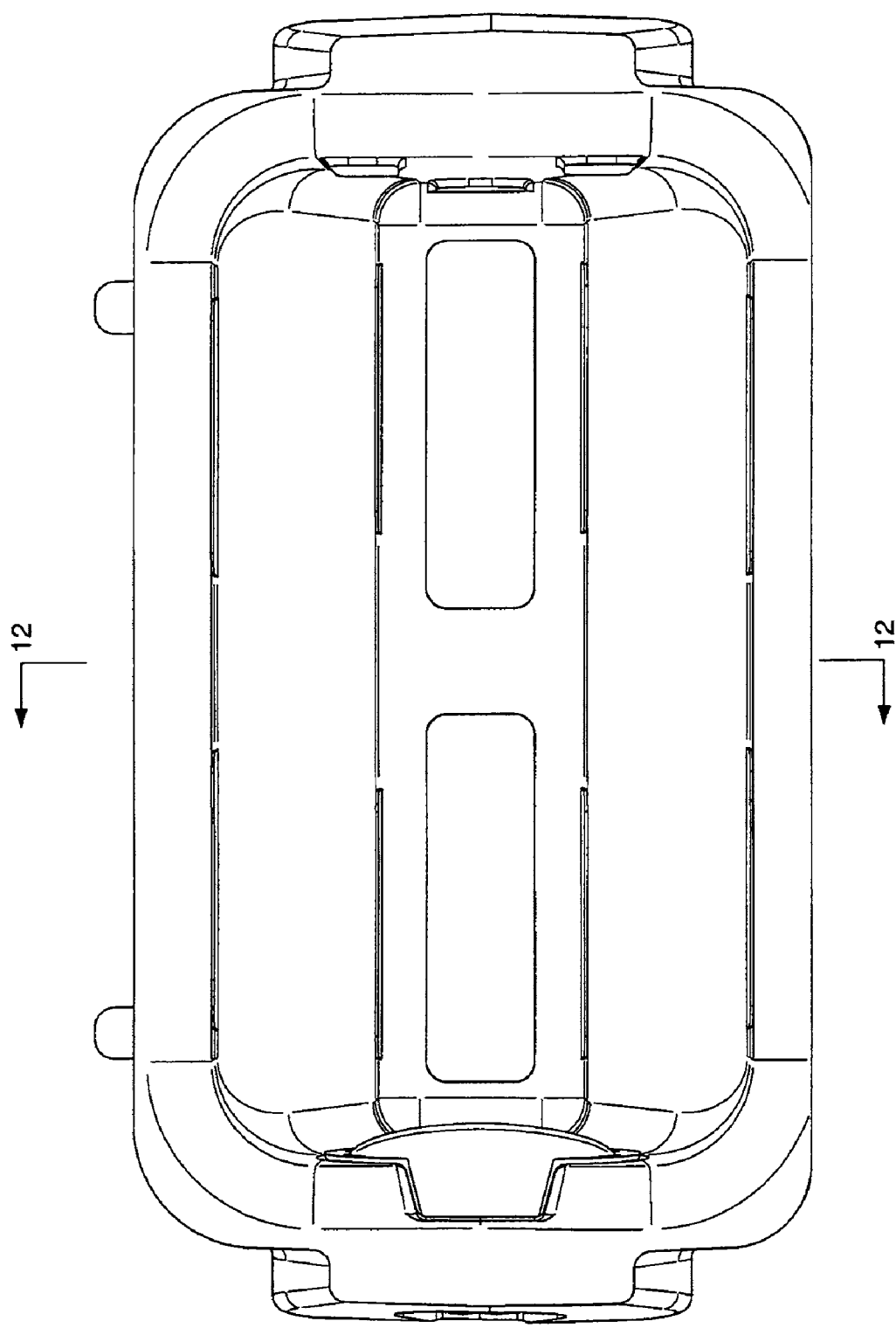
FIG. 11 is a rear view of the assembly of FIG. 9.
Figure 12:
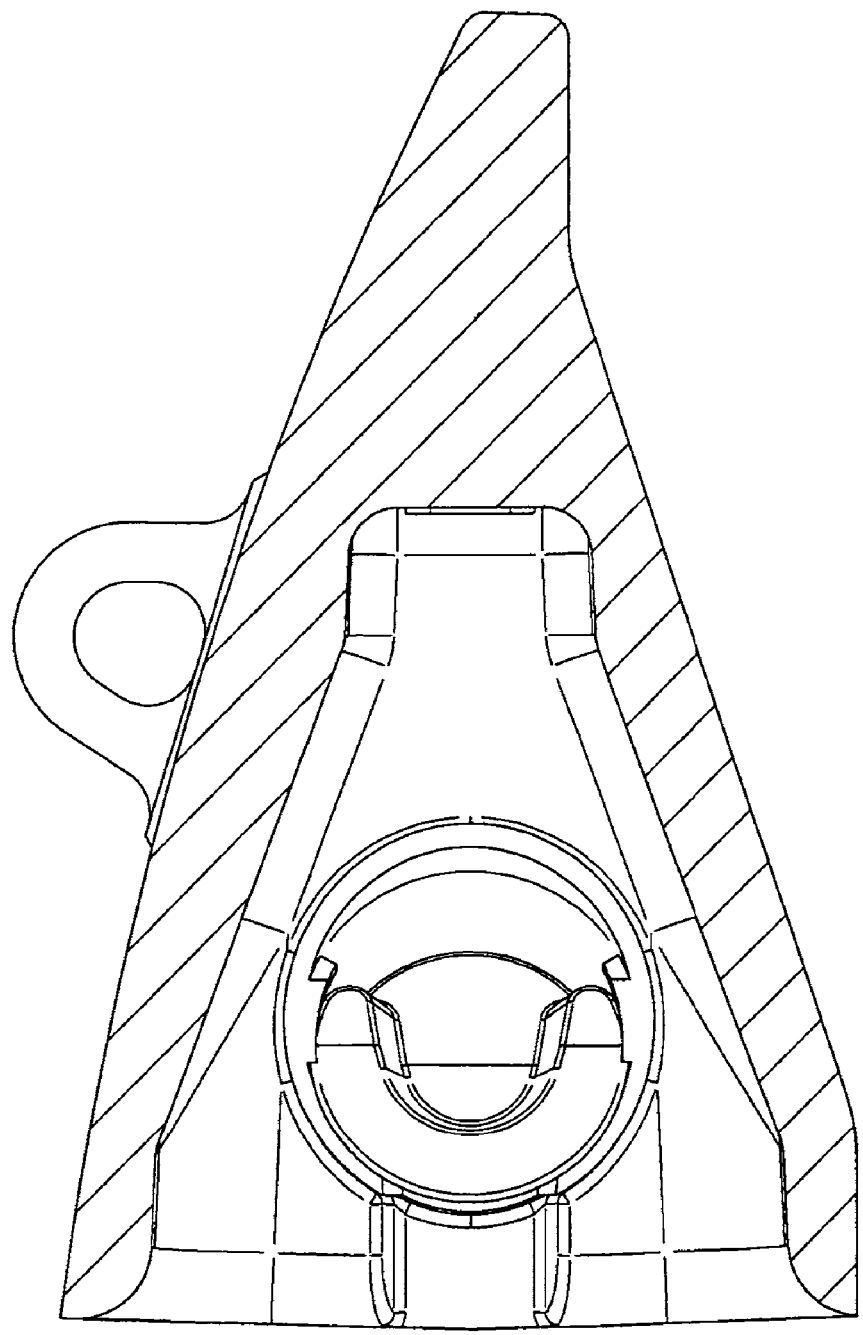
FIG. 12 is sectional view of the assembly of FIG. 9, taken along plane 12-12 indicated in FIG. 11.
Figure 13:
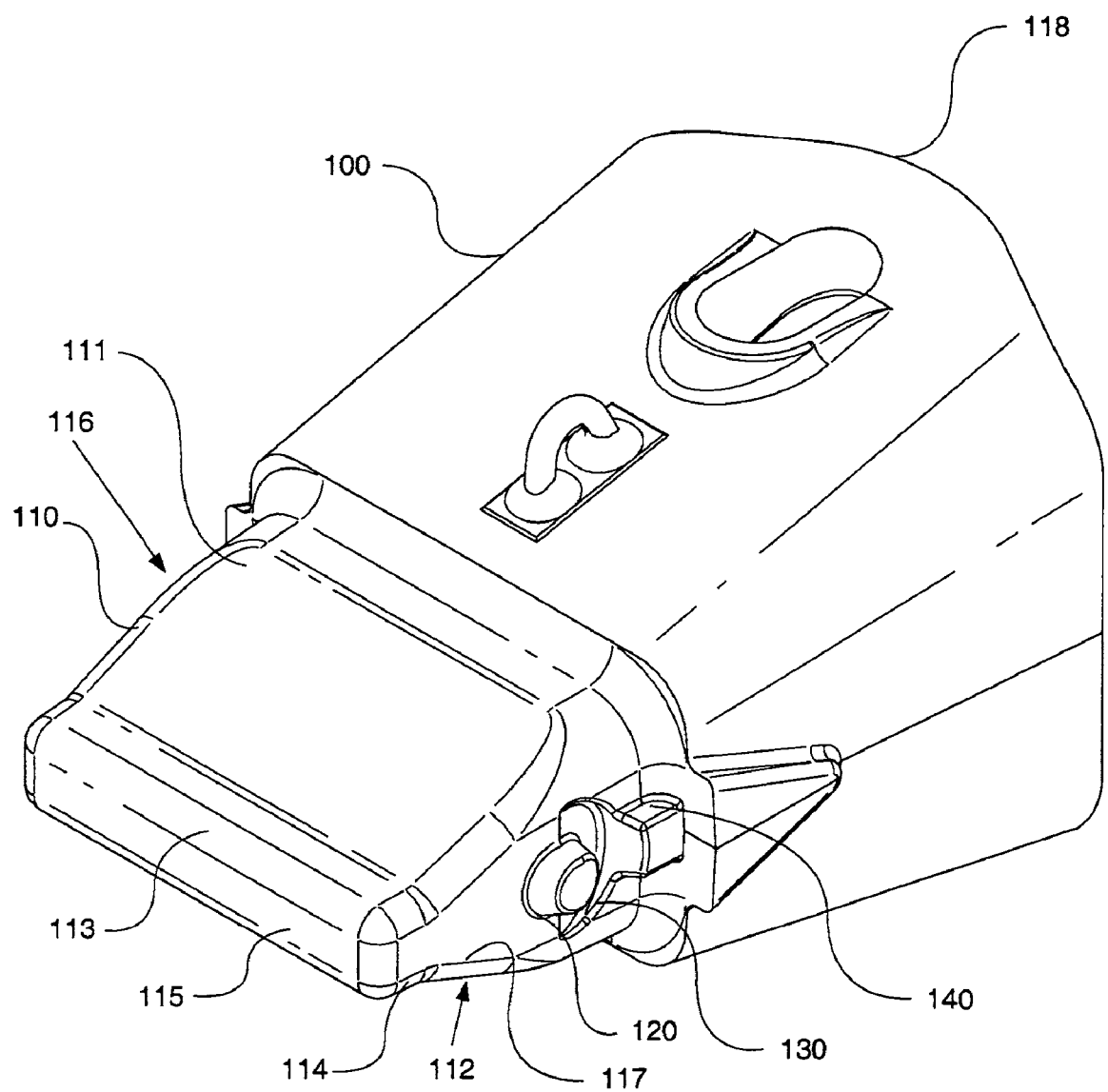
FIG. 13 is a pictorial view of an adapter according to the first embodiment.
Figure 14:
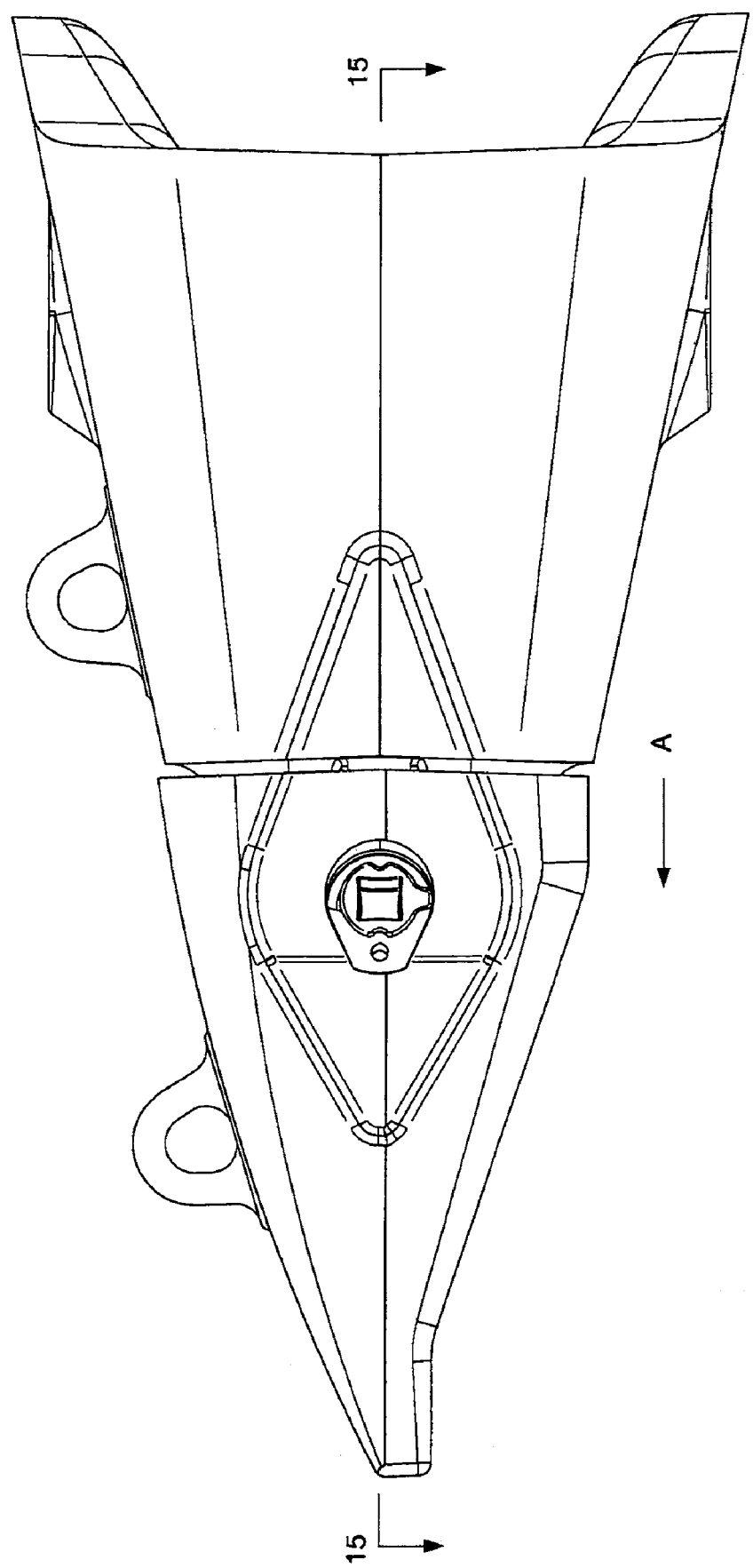
FIG. 14 is an assembly view of the tip, retainer bushing, lock, and adapter assembly according to the first embodiment.

FIG. 6 is a side view which shows retainer bushing 300 and lock 200 projecting through lock opening 421 of tip 400. Tool interface 235 is accessible by an appropriate tool to help rotate lock 200 relative to retainer bushing 300 and tip 400. Any type of suitable tool and tool interface may be used. Preferably, the tool includes a male portion, and the tool interface 235 includes a female portion.

In the unlocking position, tab 332 rests in detent 232. As lock 200 is rotated relative to retainer bushing 300, tab 332 flexes and comes out of detent 232. FIGS. 9-12 show the lock 200 rotated to its second position, or locking position. In the locking position, tab 332 rests in detent 231. Further rotation of lock 200 relative to retainer bushing 300 is prevented by stopping tab 234 contacting the head portion 330 of retainer bushing 300. Likewise, when the lock is rotated back to its unlocking position, stopping tab 234 will contact head portion 330 when tab 332 enters detent 231. This detent and stop system gives technicians a very good tactile feel for when the lock 200 has been turned to either its unlocking or locking position. In part the good tactile feel will come from the retainer bushing 300 being made from plastic and tab 332 being flexible enough to permit easy rotation, while still providing enough holding power against detents 231, 232 to hold lock 200 in its unlocking or locking position. Movement of the lock 200 from its locking to unlocking position does not require use of a hammer or other tools as is common with many types of pin retention systems for GET. Hammerless systems are increasingly preferred by technicians.

When the lock 200 is assembled into the retainer bushing 300, structures on each help positively hold the two together. Skirt portion 320 of retainer bushing 300 defines an internal annular surface 340. Lock 200 includes an external annular surface 240. Internal annular surface 340 rides against external annular surface 240 when lock 200 rotates relative to retainer bushing 300. In this embodiment, the annular surfaces 240, 340 are also tapered, resulting in an overall conical shape. Internal annular surface includes ribs 341 formed thereon which extend in a substantially circumferential direction. When lock 200 is positioned inside of retainer bushing 300, the ribs 341 interfere with external annular surface 240. In order to fit lock 200 inside retainer bushing 300, adequate force must be applied to deflect retainer bushing 300 so ribs 341 can move past external annular surface 240. Once ribs 341 move past external annular surface 240, ribs 341 and the retainer bushing 300 can return to a more natural, non-deflected position. Ribs 341 will ride against a bottom surface 224 of C-shaped portion 230, preventing lock 200 from unintentionally slipping out of retainer bushing 300. Lock 200 is able to rotate inside of and relative to retainer bushing 300.

Likewise, when the retainer bushing 300 is assembled into lock cavity 420 of tip 400, structures on each help positively hold the two together. Skirt portion 320 of retainer bushing 300 defines an external surface 350. External surface 350 includes a rib 351 formed in a substantially circumferential direction. A complementary slot 422 (FIG. 4) is formed in the lock cavity 420 of tip 400. When retainer bushing 300 is assembled into lock cavity 420, the rib 351 first interferes with lock cavity 420. In order to fit retainer bushing 300 inside of lock cavity 420, adequate force must be applied to deflect retainer bushing 300 so that rib 351 slides past the lock cavity 420 surfaces with which it interferes, until rib 351 snaps into slot 422. Retainer bushing 300 cannot rotate relative to tip 400 once installed into the lock cavity 420. The fit of rib 351 into slot 422 prevents rotation. Also, the lock opening 421 is non-circular. The part of head portion 330 of retainer bushing 300 which fits into the lock opening 421 is also non-circular. The fit of the head portion 330 into the lock opening 421 and the non-circular shape of each also prevents the retainer bushing 300 from rotating relative to the tip 400.

Holding together, under normal conditions, the lock 200 to the retainer bushing 300, and the retainer bushing 300 to the tip 400, has several advantages. First, during shipping of a replacement tip assembly (including tip 400, retainer bushing 300, and lock 200) to a jobsite, all three components stay together without becoming mixed up or lost. Second, during installation, it is simple to keep all three components in position relative to one another while the tip assembly is slid onto an adapter or other work tool. The installation may sometimes be conducted in challenging field conditions, including mud and snow. Being able to keep all the components together prevents them from being dropped into the mud and snow and becoming lost. Further, a technician who may be wearing protective gloves will not be required to handle the lock 200 and retainer bushing 300 which are smaller components and may not be as easily grasped and manipulated. In general, this feature greatly enhances the ease and speed of installation.

With reference now to FIGS. 13-17, an adapter 100 is illustrated which may be used with the tip 400, retainer bushing 300, and lock 200. Adapter 100 includes a nose portion 110. Nose portion 110 is shaped to fit inside of adapter receiving cavity 430 of tip 400. The shape of nose portion 110, and the complementary shape of adapter receiving cavity 430, may be selected to suit any particular need or application. Several different shapes have been used in prior GET systems, and any suitable general shape could be selected. The nose portion 110 includes opposite sloping top and bottom surfaces 111, 112 which slope towards one another and toward two opposite flat surfaces 113, 114, and a flat front surface 115. The nose portion 110 also includes two opposite side surfaces 116, 117.

Opposite the nose portion 110 is the rear portion 118 which may include a second adapter receiving cavity 119. In this embodiment, as is known in this field, adapter 100 is configured to be received onto a second adapter that is mounted to a work tool. The second adapter (not shown) would include a nose portion that complements the second adapter receiving cavity 119.

Figure 17:
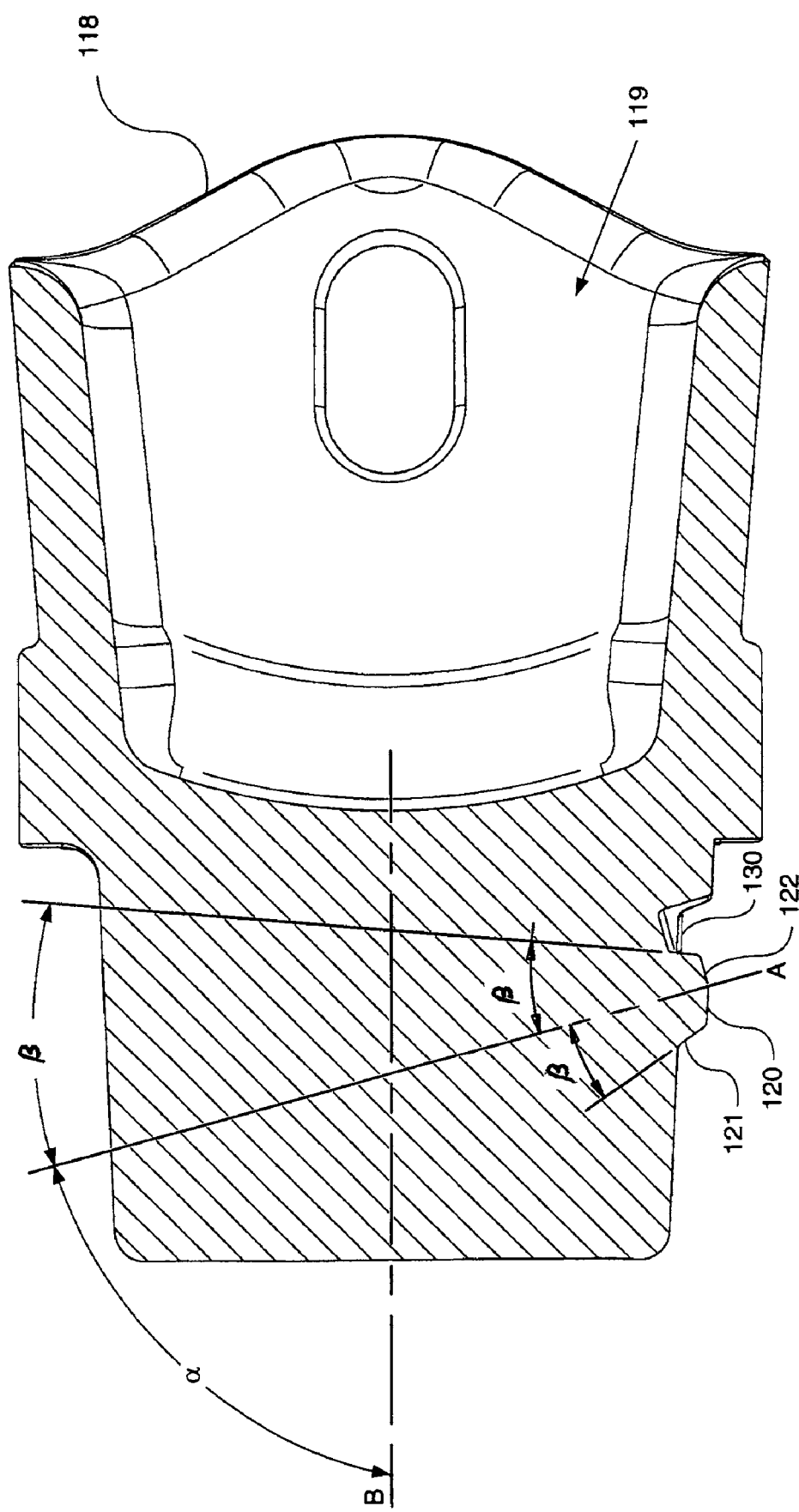
FIG. 17 is a sectional view of the adapter of FIG. 15 (the tip, retainer bushing, and lock have been removed in this view).
Figure 18:
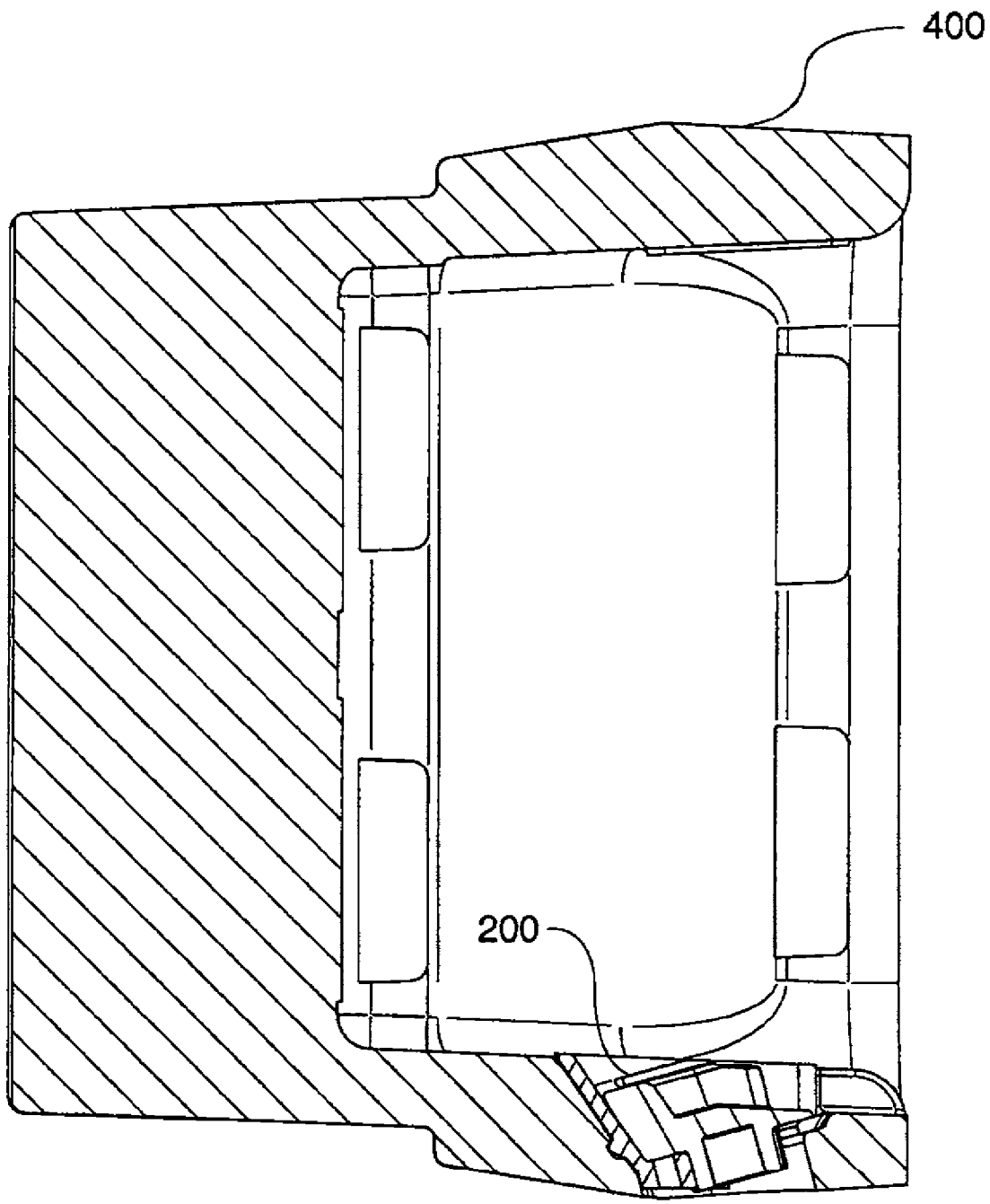
FIG. 18 is a sectional view of the tip, lock, and retainer bushing of FIG. 15 (the adapter has been removed in this view).

On side surface 117 is formed a post 120. Post 120 in this embodiment is of a generally conical shape. Other shapes could be selected to suit other designs. Post 120 includes a substantially conical surface 121, and a substantially flat end surface 122. As seen in FIG. 17, conical surface 121 defines a central axis A of the cone shape. Conical surface 121 is formed at a taper angle β of approximately 10-30 degrees, and more preferably about 20 degrees. The adapter 100 defines a plane of symmetry B as illustrated in FIG. 17 (the adapter 100 is generally symmetrical about the plane B, discounting the post 120 and related structure). The angle α between plane B and axis A is approximately 65-85 degrees, and more preferably about 75 degrees.

Adapter 100 also includes a half-annular-shaped cut 130 into the side surface 117 immediately adjacent and behind (in the direction of rear portion 118) the post 120. Immediately adjacent and behind (in the direction of rear portion 118), the adapter 100 also includes a rail 140 raised above the side surface 117. Rail 140 is generally sized and shaped to match slot 410 of tip 400.

Figure 15:
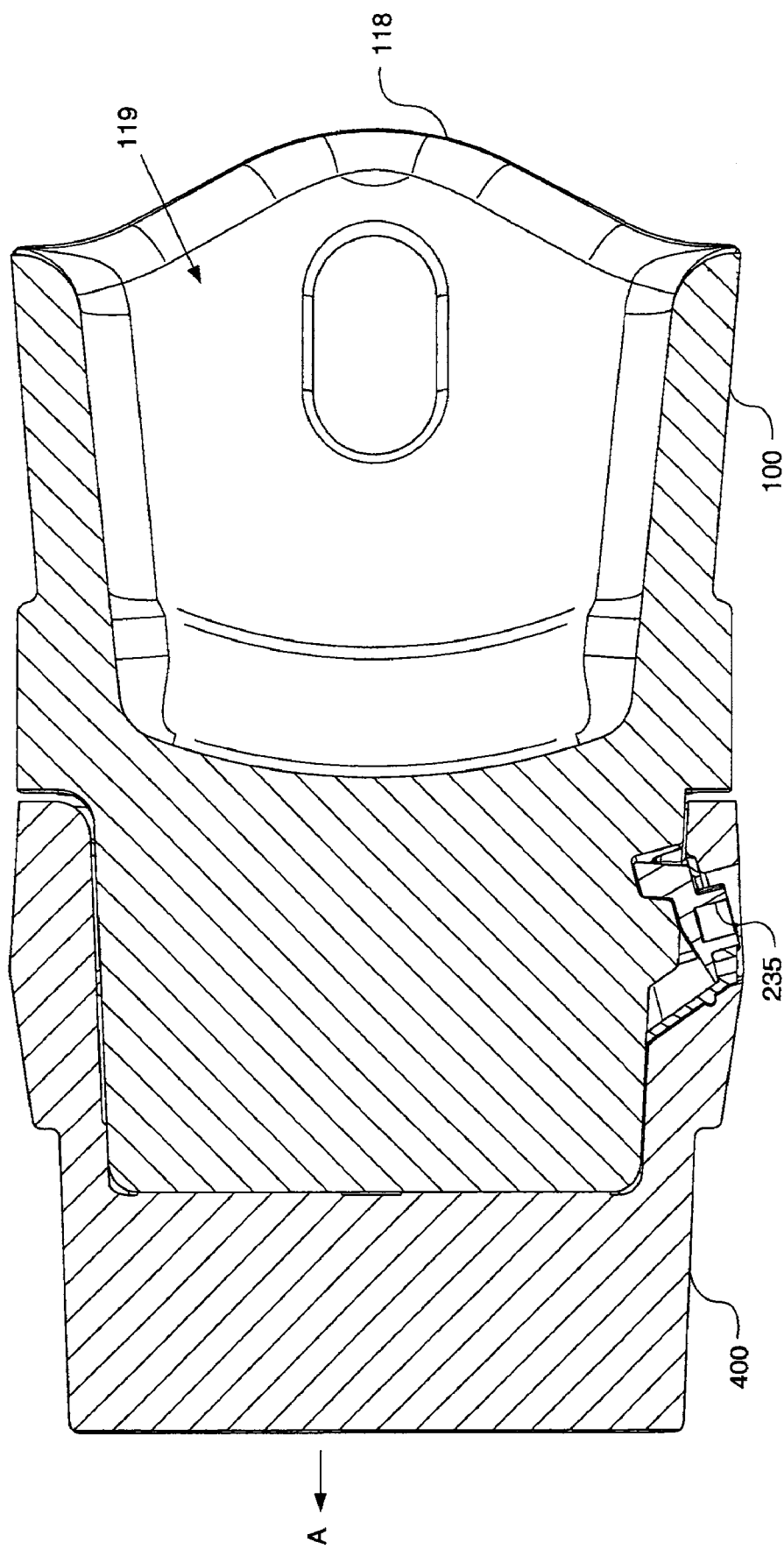
FIG. 15 is a sectional view of the assembly of FIG. 14, taken along plane 15-15 of FIG. 14, with the lock in a locking position.
Figure 16:
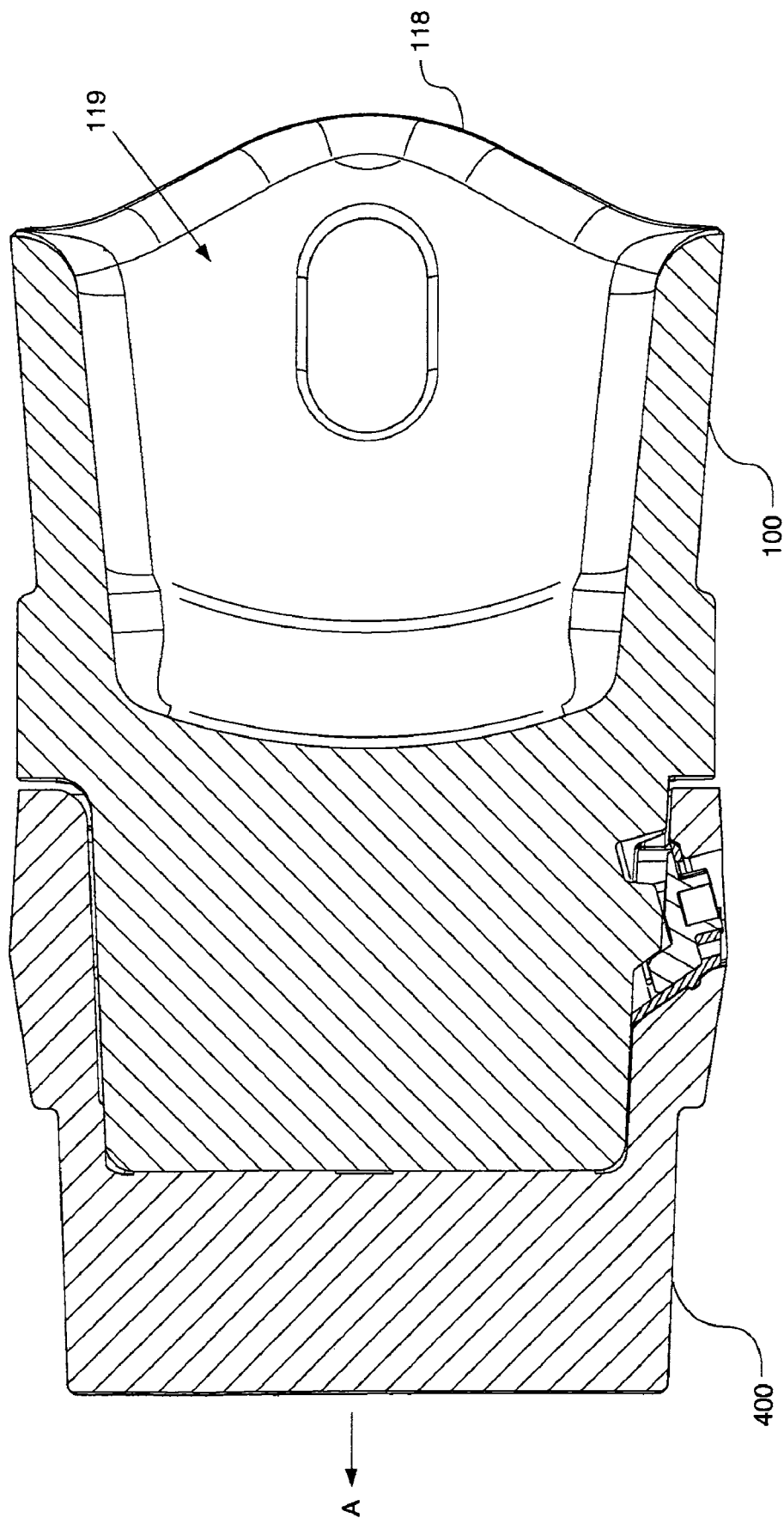
FIG. 16 is a sectional view of the assembly of FIG. 14, taken along plane 15-15 of FIG. 14, with the lock in an unlocking position.

FIGS. 15-16 show sectional views of the tip 400, bushing retainer 300, and lock 200 mounted to adapter 100. FIG. 15 shows the lock 200 rotated to its locking position so the tip 400 cannot be removed from adapter 100. FIG. 16 shows the lock 200 rotated to its unlocking position so that the tip 400 can slide in the direction of arrow A off of adapter 100. In each view, rail 140 is shown positioned in slot 410 where is serves to block dirt and other debris from entering into slot 410. If dirt and other debris were allowed to enter slot 410, they may become impacted and make removal of the tip 400 difficult because post 120 must slide through slot 410 when the tip is removed.

With central axis A of post 120 positioned at an angle with respect to the plane of symmetry B, FIG. 15 shows that the rearward most portion of conical surface 121 which contacts lock 200 in the locking position is at an angle near perpendicular to the direction of force of the tip 400 being pulled straight off of adapter 100 (as indicated by arrow A). This helps prevent the force of the tip 400 being pulled off of adapter 100 from twisting the tip 400, deflecting out of position lock 200 and causing the lock 200 to slip off of post 120 in a failure. Positioning the post 120 in this manner also minimizes the magnitude of the reaction force that will tend to push lock 200 into the lock cavity 420. The minimized reaction forces can be counteracted by compressive forces in the tip 400.

Figure 19:
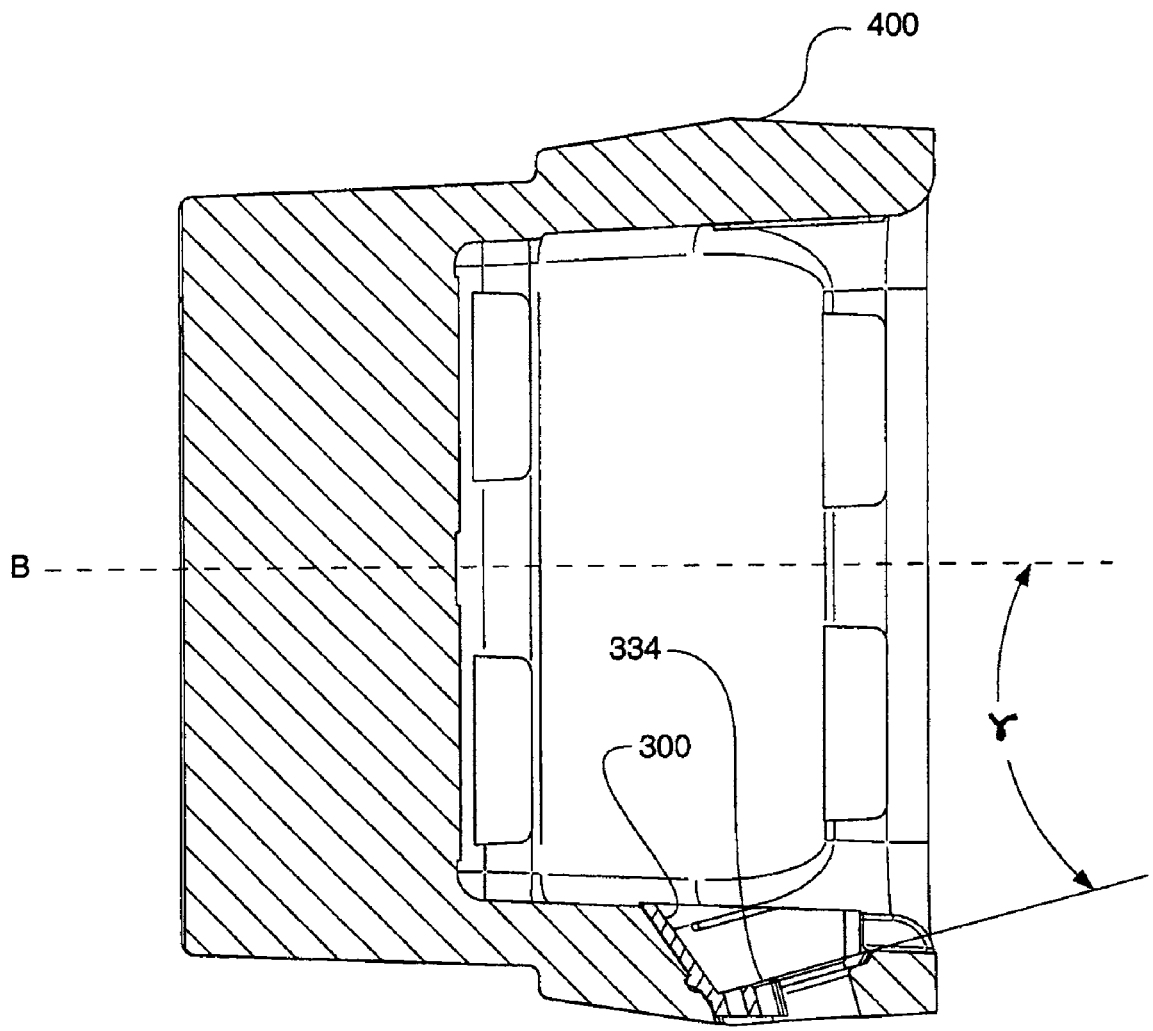
FIG. 19 is a sectional view of the tip and retainer bushing of FIG. 15 (the adapter and lock have been removed in this view).
Figure 21A:
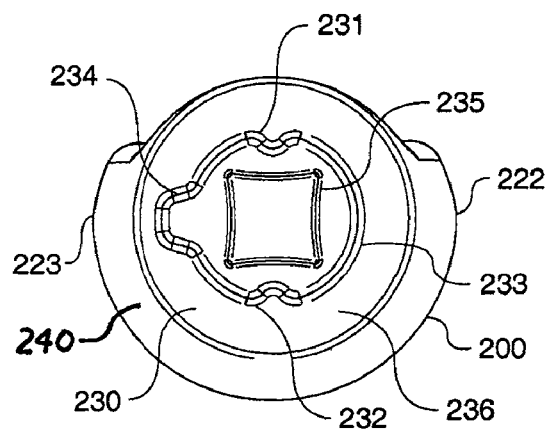
FIGS. 21A-E are views of the lock of the first embodiment.
Figure 21B:
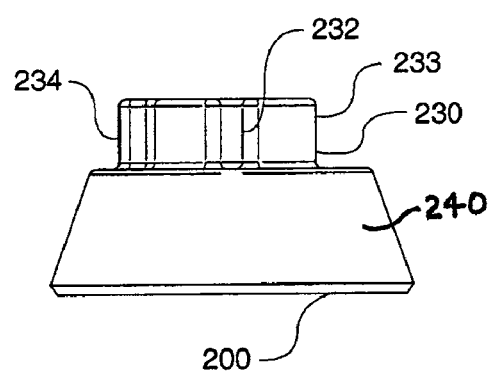
Figure 21C:
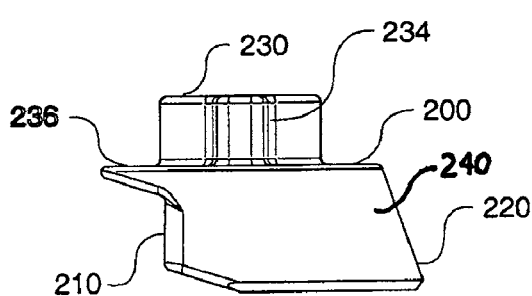
Figure 21D:
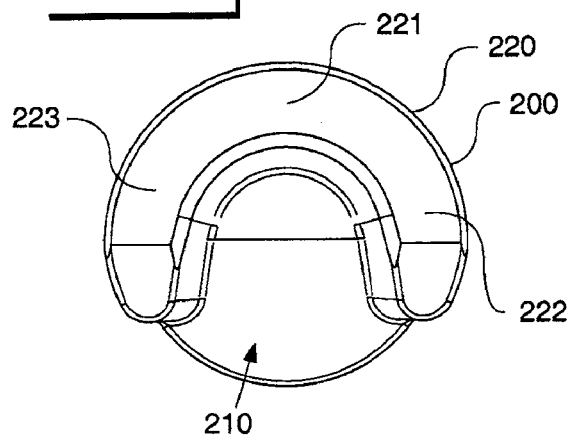
Figure 21E:
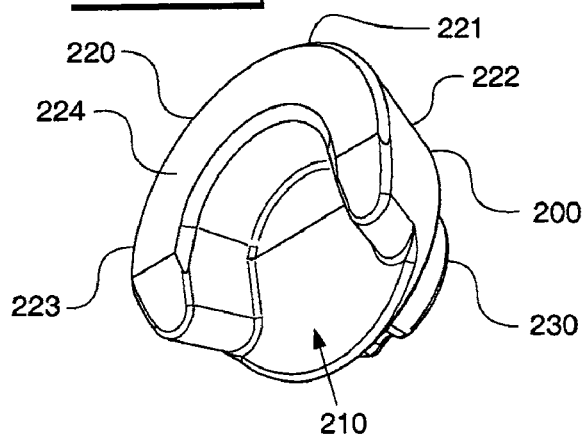

FIG. 19 shows that when positioned in tip 400, retainer bushing 300 has a bottom surface 334 set at an angle γ relative to the plane of symmetry B of tip 400 of approximately 5 to 25 degrees, and most preferably 15 degrees. Head portion 230 of lock 200 has a bearing surface 236 that abuts and slides on bottom surface 334 of retainer bushing 300. With bottom surface 334 set at this angle, the lock 200 rotates between its locking and unlocking position about an axis approximately parallel to central axis A of the post 120.

INDUSTRIAL APPLICABILITY

The foregoing ground engaging tool system may be used in industry to provide protection and improved digging ability for buckets, blades and other work tools on construction and mining machinery, and other types of machinery.

We claim:

1. A retainer system for a ground engaging tool, comprising:
   a lock including:
      a C-shaped portion defining a slot;
      a head portion attached to the C-shaped portion and having a tool interface; and
   a retainer bushing having a skirt portion formed with an internal surface configured to rotatably receive an external surface of the C-shaped portion of the lock, the lock being rotatable along the internal surface of the skirt portion of the retainer bushing, and wherein the skirt portion of the retainer bushing includes a slot, the slot of the skirt portion of the retainer bushing being substantially aligned with the slot of the lock when the lock is in an unlocked position.

2. The retainer system of claim 1, in which the C-shaped portion of the lock comprises a bottom leg, a rear leg, and a top leg.

3. The retainer system of claim 2, in which the slot of the lock is interposed between the top leg and the bottom leg.

4. The retainer system of claim 1, in which the interior surface of the skirt portion of the retainer bushing has a conical shape.

5. The retainer system of claim 1, wherein:
   the lock includes a first detent and a second detent; and
   the retainer bushing further includes a tab configured to selectively engage the first detent and the second detent.

6. The retainer system of claim 5, in which the retainer bushing includes a head portion attached to the skirt portion, and in which the tab is provided on the head portion of the retainer bushing.

7. The retainer system of claim 1, in which the head portion of the lock further comprises a stopping tab configured to allow rotation of the lock between the unlocked position and a locked position and to prevent rotation beyond the unlocked position or the locked position.

8. The retainer system of claim 1, in which the lock includes a bearing surface and the retainer bushing includes a surface configured to rotatably engage the bearing surface.

9. The retainer system of claim 8, including a body defining a plane of symmetry, in which the surface of the retainer bushing is set at an angle y relative to the plane of symmetry of approximately 5 to 25 degrees.

10. The retainer system of claim 1, in which the retainer bushing includes an opening sized to receive the head portion of the lock.

11. The retainer system of claim 5, in which the tab includes a relief hole.

12. The retainer system of claim 1, in which the skirt portion of the retainer bushing includes an exterior surface having an annular, circumferential ridge.

13. The retainer system of claim 1, in which the C-shaped portion of the lock includes a bottom surface, and in which the internal surface of the skirt portion of the retainer bushing includes a circumferential rib positioned to engage the bottom surface of the C-shaped portion of the lock when the retainer bushing and lock are assembled.

14. A retainer system for a ground engaging tool, the retainer system comprising:
   a lock including:
      a C-shaped portion having a bottom leg, a rear leg, and a top leg, in which a slot is interposed between the top leg and the bottom leg;

a head portion attached to the C-shaped portion and having a tool interface;
a first detent;
a second detent; and
a tab configured to selectively engage the first detent and the second detent;
wherein the lock is rotatable between an unlocked position, in which the tab engages the first detent, and a locked position, in which the tab engages the second detent.

15. The retainer system of claim 14, further comprising a retainer bushing having a skirt portion formed with an internal surface configured to rotatably receive an external surface of the C-shaped portion of the lock, in which the lock is rotatable relative to the retainer bushing, and in which the tab is formed on the retainer bushing.

16. A retainer system for a ground engaging tool, the retainer system comprising:
a lock having a C-shaped portion defining a slot, and a head portion attached to the C-shaped portion and having a tool interface, wherein the lock further includes a first detent and a second detent; and
a retainer bushing including a skirt portion formed with an internal surface configured to rotatably receive an external surface of the lock, the retainer bushing including a tab configured to selectively engage the first detent and the second detent;
wherein the lock is rotatable relative to the retainer bushing between an unlocked position, in which the tab engages the first detent, and a locked position, in which the tab engages the second detent.

17. The retainer system of claim 16, in which the skirt portion of the retainer bushing includes a slot, and in which the slot of the skirt portion of the retainer bushing is aligned with the slot of the C-shaped portion of the lock when the lock is in the unlocked position.

18. The retainer system of claim 17, in which the head portion of the lock further comprises a stopping tab configured to allow rotation of the lock between the locked position and the unlocked position and to prevent rotation beyond the locked position or the unlocked position.

19. A retainer system for a ground engaging tool, comprising:
a lock including:
a C-shaped portion defining a slot, the C-shaped portion including an outer surface with a conically shaped portion;
a head portion attached to the C-shaped portion and having a tool interface;
a first detent; and
a second detent, wherein the first and second detents assist in securing the lock in a locked or unlocked position.

20. The retainer system of claim 19, wherein the C-shaped portion of the lock includes an inner surface adjacent the slot, the inner surface including a conically shaped portion.

21. The retainer system of claim 19, wherein the C-shaped portion of the lock comprises a bottom leg, a rear leg, and a top leg.

22. The retainer system of claim 21, wherein the head portion of the lock extends between the bottom leg and the top leg adjacent one side of the slot.

23. The retainer system of claim 19, wherein the first and second detents include recesses in the lock.

24. The retainer system of claim 19, wherein the first and second detents are spaced circumferentially approximately 180 degrees from one another.

25. The retainer system of claim 19, wherein the head portion of the lock includes a stopping tab configured to allow rotation of the lock between the locked position and the unlocked position but prevent rotation beyond the locked position or the unlocked position.

26. The retainer system of claim 19, further comprising a retainer bushing having a skirt portion formed with an internal surface that includes a conically shaped portion configured to rotatably receive the conically shaped portion of the outer portion of the C-shaped portion of the lock.

27. The retainer system of claim 26, wherein the skirt portion of the retainer bushing includes a slot, the slot of the skirt portion of the retainer bushing being substantially aligned with the slot of the lock when the lock is in the unlocked position.

* * * * *